US006787367B1

(12) United States Patent
Suovaniemi et al.

(10) Patent No.: US 6,787,367 B1
(45) Date of Patent: Sep. 7, 2004

(54) SUCTION DEVICE

(75) Inventors: Osmo Suovaniemi, Helsinki (FI); Erkki Kaski, Luvia (FI); Ari Luukkanen, Espoo (FI); Erkki Vesanen, Vantaa (FI)

(73) Assignee: Biohit Oyj, Helsinki (FI)

( * ) Notice: Subject to any disclaimer, the term of this patent is extended or adjusted under 35 U.S.C. 154(b) by 101 days.

(21) Appl. No.: 09/980,196

(22) PCT Filed: Jun. 16, 2000

(86) PCT No.: PCT/FI00/00544

§ 371 (c)(1), (2), (4) Date: Nov. 30, 2001

(87) PCT Pub. No.: WO01/03835

PCT Pub. Date: Jan. 18, 2001

(30) Foreign Application Priority Data

Jul. 7, 1999 (FI) ................................................ 991553

(51) Int. Cl.[7] ............................ B01L 3/02; B01L 11/00; G01N 1/10

(52) U.S. Cl. ....................... 436/180; 422/100; 422/101; 73/863.32; 73/864; 73/864.01; 73/864.11; 73/864.13; 73/864.14; 73/864.16

(58) Field of Search ................................ 422/100, 101, 422/102, 916, 922–925; 73/863.32, 863.23, 864, 864.01, 863.25, 864.11, 864.13, 864.16, 864.91, 863.14, 863.11; 436/180

(56) References Cited

U.S. PATENT DOCUMENTS 4,283,950 A * 8/1981 Tervamaki ............... 73/864.14
5,178,838 A * 1/1993 Sala et al. .................. 422/102
5,352,410 A * 10/1994 Hansen et al. ................ 422/58
5,364,596 A * 11/1994 Magnussen et al. ........ 422/100
5,580,529 A * 12/1996 DeVaughn et al. ......... 422/101
5,614,153 A * 3/1997 Homberg .................... 422/100
5,876,918 A * 3/1999 Wainwright et al. ........... 435/4
5,919,356 A * 7/1999 Hood .......................... 210/85
6,197,259 B1 * 3/2001 Kelly et al. ................. 422/100
6,299,841 B1 * 10/2001 Rainin et al. ............... 422/100
6,482,361 B1 * 11/2002 Suovaniemi ................ 422/100
6,532,837 B1 * 3/2003 Magussen et al. ....... 73/864.14
2001/0042317 A1 * 11/2001 Yarborough et al. .......... 34/287
2001/0043885 A1 * 11/2001 Wanner ...................... 422/100
2001/0055547 A1 * 12/2001 Rainin et al. ............... 422/100
2002/0001545 A1 * 1/2002 Cronenberg et al. ........ 422/100
2002/0041833 A1 * 4/2002 Telimaa et al. ............. 422/100
2003/0039589 A1 * 2/2003 Smith ......................... 422/100
2003/0082078 A1 * 5/2003 Rainin et al. ............... 422/100
2003/0099576 A1 * 5/2003 Li et al. ..................... 422/100
2003/0099578 A1 * 5/2003 Cote et al. .................. 422/100

* cited by examiner

*Primary Examiner*—Jill Warden
*Assistant Examiner*—Brian R Gordon
(74) *Attorney, Agent, or Firm*—Birch, Stewart, Kolasch & Birch, LLP

(57) ABSTRACT

A method for detaching a barrier means adapted to the end part of the suction device for closing an opening in the end part by the movement of a plunger intended for changing the volume of a cylindrical space provided in the end part whereby the barrier means is removed by bringing means for limiting the movement of the plunger in the cylindrical space, e.g. means intended for removing the disposable tip, in such a position that the plunger can be brought into contact with the barrier means for detaching the barrier means from the end part of the suction device.

10 Claims, 2 Drawing Sheets

SUCTION DEVICE

This application is the national phase under 35 U.S.C. § 371 of PCT International Application No. PCT/FI00/00544 which has an International filing date of Jun. 16, 2000, which designated the United States of America and was published in English.

BACKGROUND OF THE INVENTION

1. Field of the Invention

The object of the invention is a method to be used in a suction device, such as a mechanical pipette, comprising a body and an associated end part with an open distal end directed away from the body for removably attaching a disposable tip enclosing a sample space for receiving a liquid sample, the end part of the suction device enclosing a cylinder space containing a reciprocatingly movable means for changing the volume of the cylindrical space for receiving a sample to the tip and removing it therefrom, for removing a barrier means adapted to the end part of the suction device and closing the opening in the end part. The object of the invention is also a suction device for employing the method.

2. Description of the Prior Art

In electronic as well as in mechanical suction devices, pipettes, barrier means are used in their end part to prevent liquids or reagents to be dispensed or molecules vaporizing from them from entering the inner parts of the pipette. These liquids or vaporized molecules in entering the inner parts of the pipette can contaminate the said inner parts and further in moving over from one sample to another can cause the contamination of the other sample. Samples and/or reagents can be valuable and in any case in the laboratory work cannot be accepted anything that deteriorates the reliability of the operation.

The barrier means are usually adapted to cover the opening in the end part of the suction device forming a gaseous passage between the cylindrical space in the end part of the suction device and a sample space of the disposable tip to be attached removably to the end part of the suction devices. The barrier means attach to the end part of the suction device, to the opening therein and/or to the cylindrical space so that they can easily be removed when desired.

The removal of the barrier means manually exposes the user of the suction device to samples or reagents which may be poisonous or dangerous.

SUMMARY OF THE INVENTION

To solve this problem, in the method according to the invention the barrier means are removed with the movement of the plunger, which is reciprocatingly movable in the cylindrical space of the suction device and which is intended for changing the volume of the cylindrical space. The said plunger is moved in the cylindrical space for taking samples or reagents into the disposable tip attached to the suction device, for dispensing and/or for removing them from the said tip. In these operations the plunger is moved between its two extreme positions, of which the first one with the plunger drawn into the cylinder corresponds the maximal suction, and of which the second one with the plunger coming to the vicinity of the opening in the end part of the suction device corresponds to the removal of the sample. For moving the plunger, the body of the suction device comprises operating means in association with the plunger. The suction device has preferably also means in association with the operating means for limiting the movement of the plunger in the cylindrical space.

The disposable tip attached to the suction device, onto the end of its end part, is removed in some suction devices with a sleeve movable on the end of the end part. The moving of the sleeve can take place as a separate operation directly manually or with separate means such as levers or bars. The sleeve can in some cases also be moved with means in association with the operating means of the said plunger or the means associated with the moving of the sleeve can be made in association with the operating means of the plunger or with means in association with it for removing the disposable tip by means of the sleeve.

The barrier means in the suction devices are removed from the suction device after the removal of the disposable tip when necessary, the barrier means are generally not always removed in connection of the removal of the disposable tip.

It is characteristic for the method according to the invention that the barrier means adapted to the end part of the suction device are removed by moving the plunger first in the direction of the opening in the end part of the suction device in contact with the barrier means and then by moving the plunger in the direction of the said opening for removing the barrier means from the end part of the suction device.

To prevent the unintentional or non-intended removal of the barrier means, the means for limiting the movement of the plunger in the cylindrical space are brought in one preferred embodiment of the method according to the invention in such a position in which the plunger cannot be moved into contact with the barrier means. When the barrier means are desired to be removed, the means limiting the movement of the plunger are brought in such a position that the plunger can be moved in contact with the barrier means and that in moving the plunger further in the direction of the opening in the end part, the movement of the plunger removes the barrier means from the end part of the suction device.

It is also characterizing to the suction device according to the invention that the suction device is provided with means which limit the movement of the plunger in the cylindrical space and which can be brought into at least one position in which the plunger can be brought in contact with the barrier means adapted to the end part of the suction device for removing the barrier means from the end part of the suction device.

In a preferred embodiment of the invention as means which limit the movement of the plunger and prevent the moving of the plunger into contact with the barrier means are used preferably means for removing the disposable tip such as e.g. the sleeve movable on the end of the end part and/or means associated with it, which means can be positioned with regard to the plunger and/or its operating means and/or means associated with them in a plurality of positions for limiting the movement of the plunger. When the user wants to remove the barrier means, the user selects such a position among the mutual positions between the plunger, its operating means and/or means associated with them, and the sleeve and/or means associated with it, in which the plunger can be moved into contact with the barrier means and in which position the plunger can further be moved for removing the barrier means.

In a preferred embodiment of the invention, the plunger is never brought directly into contact with the barrier means, but the plunger is provided with means, which in moving the plunger towards the opening in the end part of the suction device, can be brought into contact with the barrier means and which in continuing the movement of the plunger bring about the removal of the barrier means from the end part of the suction device. These means are in a preferred embodiment of the invention a telescopic extension of the plunger.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention is described in the following in detail with embodiments by referring to the accompanying drawings which are given by way of illustration only, and thus are not limitative of the present invention, and in which.

In the figures like reference numbers are used for like parts.

DETAILED DESCRIPTION OF THE PREFERRED EMBODIMENTS

Figure 1:
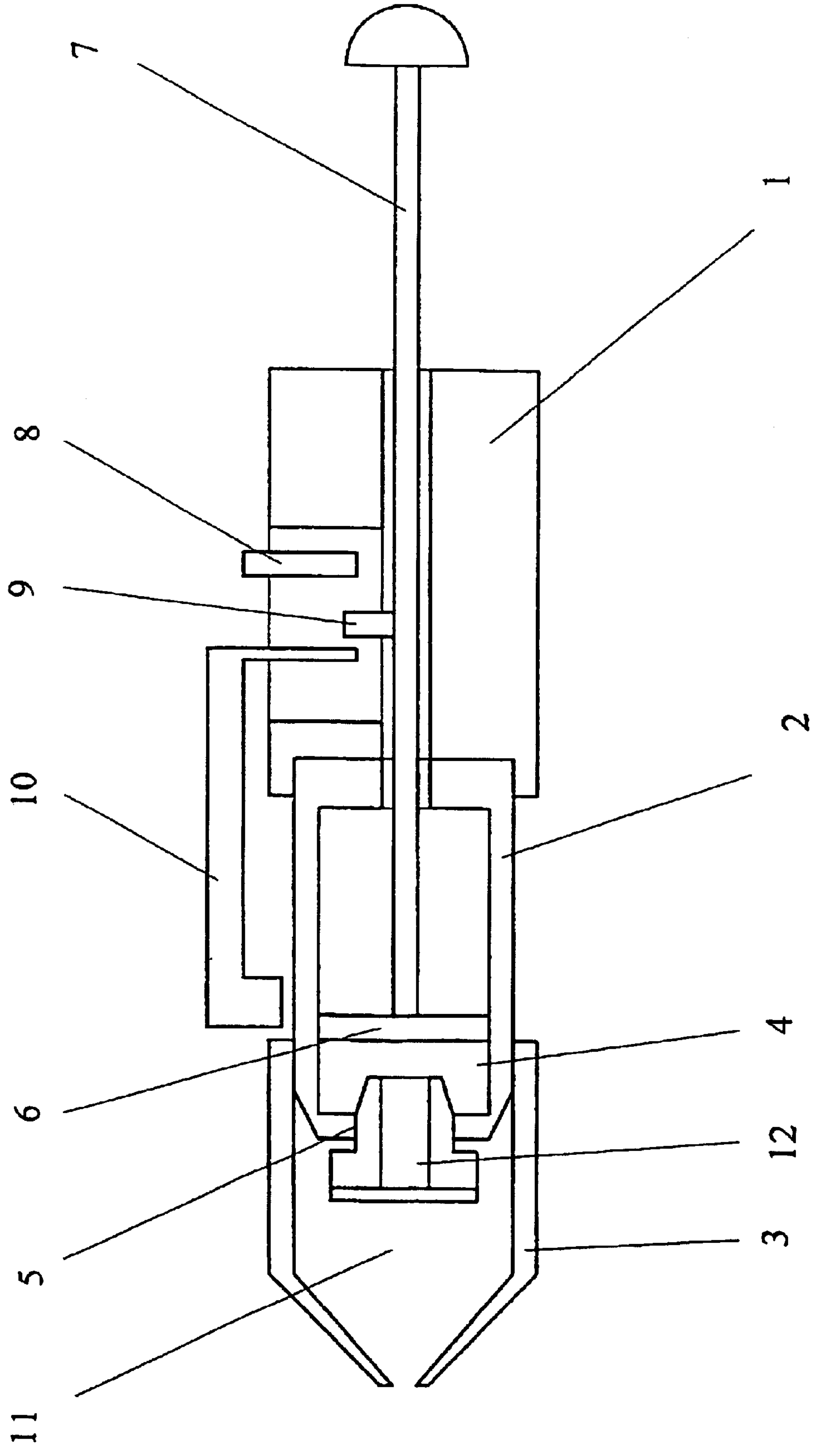
FIG. 1 presents a longitudinal cross-section of the suction device.

In FIG. 1 the body of the suction device is referenced with reference number 1 and the end part removably attached thereon with reference number 2. The end part 2 encloses a cylindrical space 4 having a reciprocatingly movable means 6, a plunger, for changing the volume of the cylindrical space 4. For moving the plunger 6 in the cylindrical space the suction device is provided with operating means 7 in association with the plunger 6. A disposable tip 3 provided with a sample space 11 for liquid samples can be attached to the end part 2 of the suction device. The end of the end part 2 is provided with an opening 5 forming a gaseous passage between the cylindrical space 4 and the sample space 11 of the disposable tip 3. A barrier means 12, permeable to gases but impermeable to liquids, is adapted to cover the opening 5 in the end of the end part 2, the barrier means preventing the entry of the samples or reagents or the molecules possibly vaporizing from them into the inner parts of the suction device.

In FIG. 1, means 8 are shown which together with the means 9 associated with the operating means 7 limit the movement of the plunger in the cylindrical space or they can be positioned in such a position with regard to the plunger 6, its operating means 7, or means 9 associated with them, that they do not limit the movement of the plunger 6.

In FIG. 1 are also shown schematically means 10 for removal of the disposable tip 3 from the end part 2 by using the movement of the plunger 6. When the plunger 6 is moved by the operating means 7, the means 9 associated with the operating means 7 can come in contact with the tip removal means 10 and in further moving the plunger 6 in the direction of the opening 5 in the end part 2 of the suction device, the means 10 come into contact with the disposable tip 3. When the movement of the plunger 6 further continues in the direction of the opening 5 of the end part 2, the means 10 bring about with their movement the removal of the disposable tip 3 from the end part 2 of the suction device. In a preferred embodiment of the invention, the plunger 6 can be moved towards the opening 5 in the end part 2 of the suction device still after the detachment of the disposable tip 3.

The means 10 have in an embodiment of the invention preferably also another position, in which the means 10 can come into contact with the plunger 6 or with means associated with it, but in which position they prevent the movement of the plunger 6 towards the opening 5 in the end part 2 of the suction device.

Still in a preferred embodiment of the invention, the means 10 can be positioned in such a position that they allow the removal of the disposable tip 3 with the movement of the plunger 6, but prevent the plunger 6 from moving in the direction of the opening 5 in the end part 2 after detachment of the disposable tip 3.

In a preferred embodiment of the method according to the invention, the barrier means is detached from the end part 2 of the suction device by positioning the means 10 in such a position that the means 9 associated with the operating means 7 come into contact with the means 10, when the plunger 6 is moved with the operating means 7 towards the opening 5 in the end part 2 of the suction device.

When the plunger 6 is further moved towards the opening in the end part 2, the means 10 come into contact with the disposable tip 3 attached to the end part 2 and when the movement of the plunger 6 continues in the direction of the opening in the end part bring about the detachment of the disposable tip 3 from the end part 2 of the suction device. After the detachment of the disposable tip 3 the means 10 are positioned in another position, in which the plunger 6 can be moved towards the opening in the end part and in which position the plunger 6 moving further comes into contact with the barrier means 12 adapted to the end part 2 and when the movement continues towards the opening 5 in the end part 2, the plunger detaches the barrier means 12 from the end part 2 of the suction device.

Figure 2:
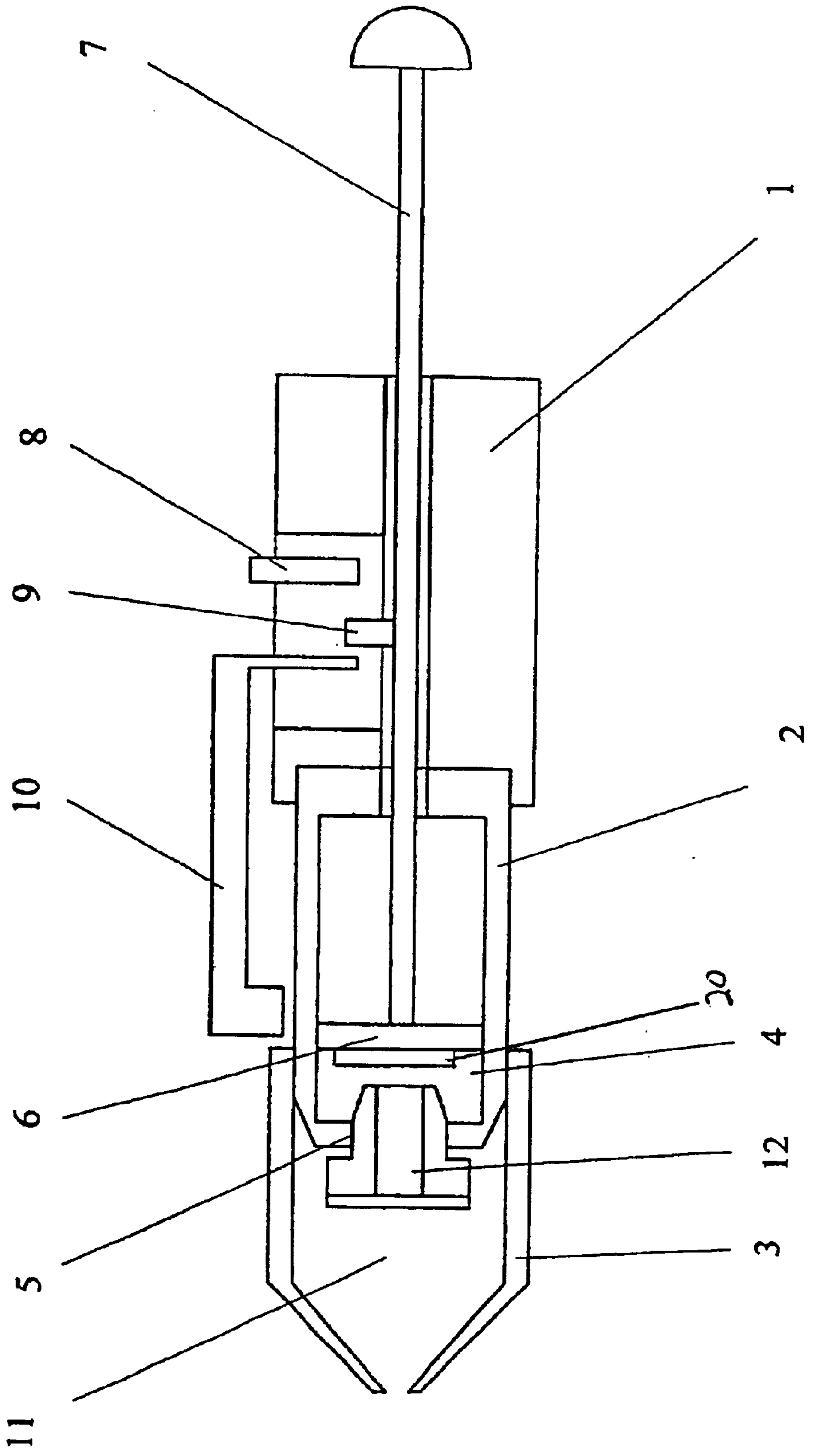
FIG. 2 is a cross-section similar to FIG. 1 of an alternative embodiment, with a plunger having a telescopic extension.

As shown in FIG. 2, a telescopic extension 20 of the plunger 6 could instead come into contact and remove the barrier means 12.

In a preferred embodiment of the invention the means 10 can be positioned in such a position after the detachment of the barrier means 12, that the means in association with the plunger 6 can come into contact with the means 10. The movement of the plunger 6 back into the cylindrical space 4 brings about the movement of the means 10 away from the end part 2 of the suction device towards the body 1 of the suction device in such a position in which the disposable tip 3 can be attached on the end of the end part 2 of the suction device. In a preferred embodiment of the invention the means 10 are at that time brought in such a position, in which the contact between the means 10 and the means associated with the plunger 6 loosens when moving the plunger 6 into the cylindrical space 4.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method in a suction device which has a body and an associated end part with an open distal end directed away from the body for removably attaching a tip enclosing a sample space for receiving a liquid sample, the end part of the suction device enclosing a cylinder space containing a plunger, the method comprising the steps of:

providing a barrier in an opening in the end part of the suction device, the barrier preventing liquid from passing into the cylinder space;

changing the volume of the cylinder space for receiving a sample into and removing a sample from the tip, the volume of the cylinder space being changed with the plunger;

detaching the barrier from the end part of the suction device by moving the plunger first in a direction of the opening in the end part of the suction device into contact with the barrier and then by moving the plunger in the direction of the opening for removing the barrier from the end part of the suction device.

2. The method according to claim 1, comprising the step of limiting movement of the plunger in the cylindrical space, the plunger being movable at least to a position in which the plunger can contact the barrier at the end part of the suction device for detaching the barrier from the end part of the suction device.

3. The method according to claim 1, comprising the step of removing the top from the end part of the suction device with an element engagable by the plunger.

4. The method according to claim 1, wherein the suction device is multichanneled.

5. The method according to claim 1, wherein the suction device is a mechanical pipette.

6. A method in a suction device which has a body and an associated end part with an open distal end directed away from the body for removably attaching a tip enclosing a sample space for receiving a liquid sample, the end part of the suction device enclosing a cylinder space containing a plunger, the method comprising the steps of:

providing a barrier in an opening in the end part of the suction device, the barrier preventing liquid from passing into the cylinder space;

changing the volume of the cylinder space for receiving a sample into and removing a sample from the tip, the volume of the cylinder space being changed with the plunger;

detaching the barrier from the end part of the suction device by moving a telescopic extension of the plunger first in a direction of the opening in the end part of the suction device into contact with the barrier and then by moving the telescopic extension of the plunger in the direction of the opening for removing the barrier from the end part of the suction device.

7. The method according to claim 6, comprising the step of limiting movement of the plunger in the cylindrical space, the plunger being movable at least to a position in which the telescopic extension of the plunger can contact the barrier at the end part of the suction device for detaching the barrier from the end part of the suction device.

8. The method according to claim 6, comprising the step of removing the tip from the end part of the suction device with an element engagable by the plunger.

9. The method according to claim 6, wherein the suction device is multichanneled.

10. The method according to claim 6, wherein the suction device is a mechanical pipette.

* * * * *